Oct. 10, 1961  F. N. TULLOS ET AL  3,003,696
INTEGRATION OF AN ELECTRICAL SIGNAL OVER A
TIME INTERVAL OF FIXED DURATION
Filed Aug. 10, 1959  2 Sheets-Sheet 1
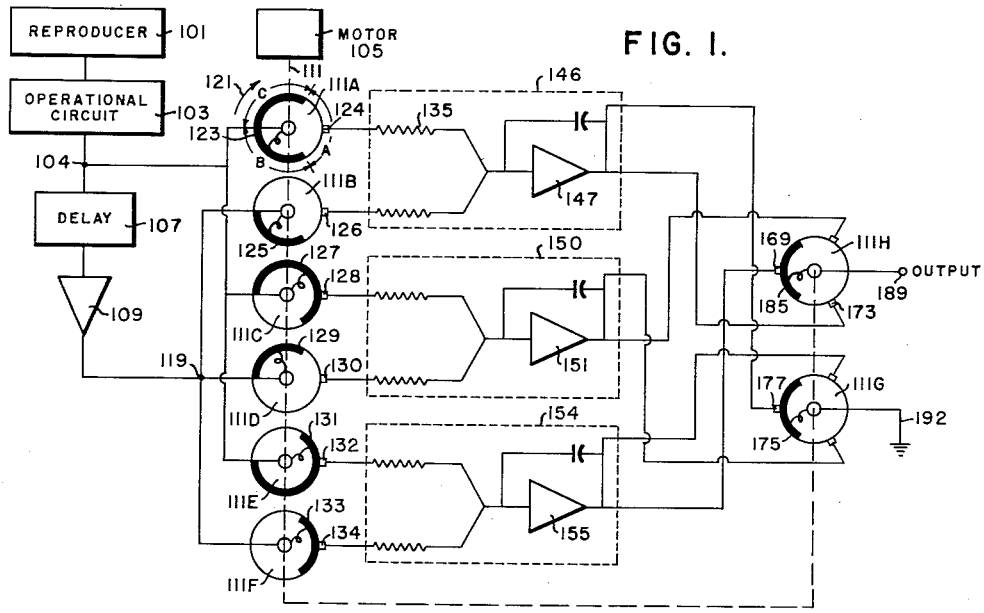
FIG. 1.
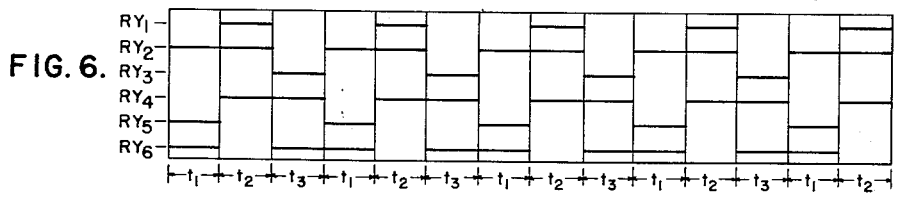
FIG. 6.
FIG. 2.
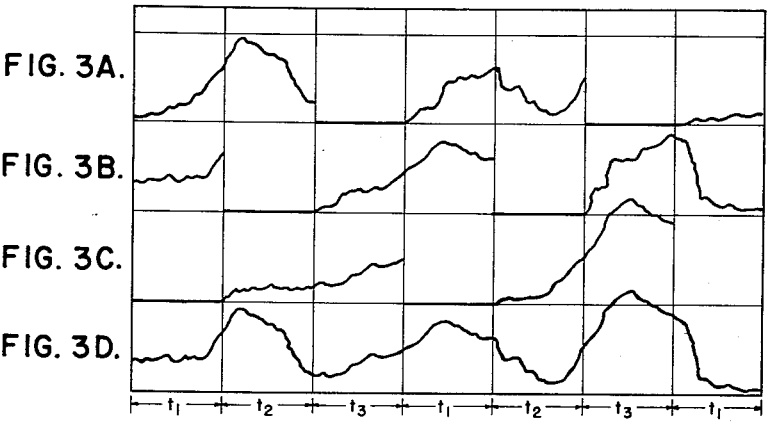
FIG. 3A.
FIG. 3B.
FIG. 3C.
FIG. 3D.
INVENTORS.
FRANK N. TULLOS,
ALLEN B. CUNNINGHAM,
BY John B Davidson
ATTORNEY.

Oct. 10, 1961  F. N. TULLOS ET AL  3,003,696
INTEGRATION OF AN ELECTRICAL SIGNAL OVER A
TIME INTERVAL OF FIXED DURATION
Filed Aug. 10, 1959  2 Sheets-Sheet 2

INVENTORS.
FRANK N. TULLOS,
ALLEN B. CUNNINGHAM,
BY
John B. Davidson
ATTORNEY.

United States Patent Office 3,003,696
Patented Oct. 10, 1961

3,003,696
INTEGRATION OF AN ELECTRICAL SIGNAL OVER A TIME INTERVAL OF FIXED DURATION
Frank N. Tullos, Houston, and Allen B. Cunningham, Bellaire, Tex., assignors, by mesne assignments, to Jersey Production Research Company, Tulsa, Okla., a corporation of Delaware
Filed Aug. 10, 1959, Ser. No. 832,724
5 Claims. (Cl. 235—181)

This invention relates generally to the correlation of a multiplicity of electrical signals, such as reproduced seismic traces, and more particularly to an integrator for integrating a variable amplitude electrical signal over an interval of fixed duration that constantly changes in time with the electrical signal.

In U.S. patent application Serial No. 726,109, filed April 3, 1958, for "Interpretation of Geophysical Data" by Troy N. Crook, there is described apparatus for correlating electrical signals reproduced from a reproducible seismogram wherein the electrical signals are shifted in time by predetermined time shifts and are added together to obtain a sum signal. The sum signal is applied to an operational circuit for emphasizing the amplitude variations thereof and thereafter applied to apparatus for obtaining an output signal indicative of the integral of the amplitude-emphasized signal over a time interval of fixed duration that constantly changes in time with the amplitude-emphasized signal. The resulting output signal is indicative of the correlation between the reproduced traces of the seismogram. The apparatus described in patent application Serial No. 726,109 splits the amplitude-emphasized signal into two channels. In one of the channels the signal is integrated directly by a first integrating means; in the other channel it is delayed by the interval of interest and is then integrated. The delayed integrated signal is reversed in amplitude and is added to the output signal of the first integrating means. Alternatively, the amplitude of the delayed signal may be reversed and added to the original signal, and the sum signal may be integrated. In either event, an output signal will be obtained which is indicative of the integral of the amplitude-emphasized signal over a time interval of fixed duration which is variable in time with the amplitude-emphasized signal.

While the apparatus described in application Serial No. 726,109 is basically sound, difficulty has been experienced in obtaining accurate results as a result of deficiencies in the integrating apparatus known to the prior art. Certain of the components of the apparatus, such as integrating amplifiers, demodulators, and other electronic circuitry, must be very accurately matched and the components thereof must be manufactured to extremely close tolerances. Even though the apparatus is very carefully designed, utilizing high quality components, it has been found that initially small errors tend to cumulate so as to produce unacceptably large cumulative errors after a period of time.

In accordance with the teaching of the present invention, use is made of at least three adding and integrating means that are actuated according to a predetermined program. Let it be assumed that one integrating means is energized by an electrical signal for a period equal to twice the interval over which it is desired to integrate the signal. Let it also be assumed that the integrating circuit is also energized by the same signal after the signal has been delayed by the interval of interest and applied to the integrating circuit in such a manner as to subtract from the original signal. For a period equal to the interval of interest, the integrating circuit will integrate the original signal alone. Thereafter, in effect, the integral of the delayed signal will subtract from the integral of the original signal so that the output signal of the integrator represents the integral of the original signal over a time interval equal to the delay interval of the delay means and variable in time with the original signal. If the integrator output is gated to an output circuit during the time that the delayed signal is being applied thereto and is restored to its original quiescent level at the end of the gating period, and if the other integrators are similarly energized and gated cyclically and sequentially, the composite signal applied by the multiplicity of integrators to the output circuit will accurately represent the integral of the original signal over a period of fixed duration without the possibility of cumulative errors becoming appreciably large.

The invention will be further described with reference to the accompanying drawing wherein:

FIG. 1 is a schematic diagram of one embodiment of the invention;

FIG. 2 is a waveform representation of amplitude-emphasized signals such as may be integrated by the invention;

FIGS. 3A through 3D depict waveform representations of the output signals of the various integrators shown in FIG. 1, and a waveform representation of the output signal of the circuit of FIG. 1, assuming that the signal of FIG. 2 is derived from the operational circuit of FIG. 1;

FIG. 6 is a bar graph illustrating the sequence in which the relays illustrated in FIG. 5 are actuated.

Figure 4:
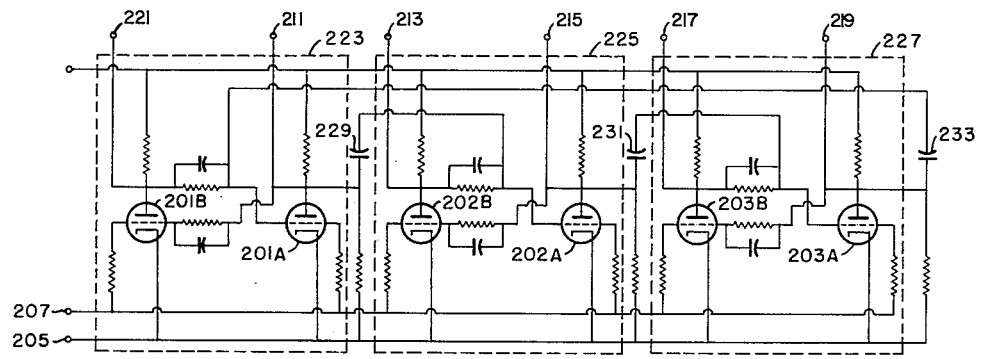
FIG. 4 is a ring relay control such as may be used in connection with the embodiment of the invention that is illustrated in FIG. 5.
Figure 4:
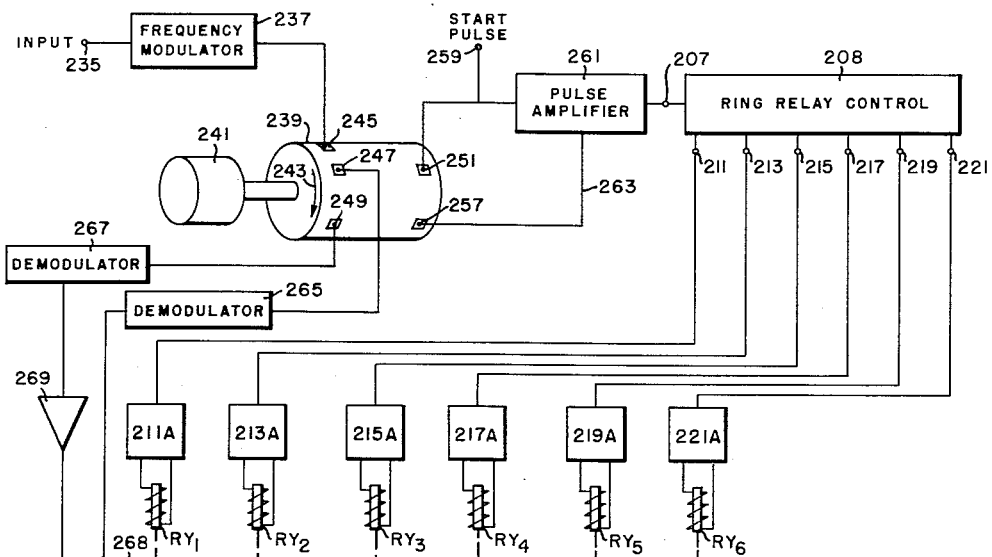

With reference now to the embodiment of the invention depicted in FIG. 1, there is shown a trace reproducing and summing device 101, the function of which is to derive an output signal indicative of the sum of the traces of a seismogram after the traces have been shifted by predetermined amounts on the time axes thereof. If it is desired, a separate adding circuit may be included in the reproducer.

The output signal of reproducer 101 is coupled to an operational circuit 103, the function of which is to emphasize the amplitude of the output signal of reproducer 101. A preferred form of operational circuit is the squaring circuit. The output signal of operational circuit 103 appears at terminal means 104.

A plurality of adding and integrating circuits 146, 150, and 154 are utilized in the invention. Each integrating circuit consists of an operational amplifier shunted by a capacitor. While three integrating circuits are shown in FIG. 1, more than three integrators may be provided. However, it is to be noted that at least three integrating circuits are necessary in the present invention. Each integrating circuit is fed by an adding circuit; if it is desired, the adding circuit may be included as an integral part of the integrating circuit. Adding integrating circuits are described in Electronic Analog Computers, by Korn and Korn (McGraw-Hill, 1956), and will not be further described herein.

The signal appearing at terminal 104 is coupled to terminal means 119 by a delay device 107 and an amplitude reversing amplifier 109. The delay device 107 may be a static delay line or a magnetic drum delay system such as are well known in the art. The characteristic of delay device 107 should be such that the signal appearing at terminal means 119 is delayed in time relative to the signal appearing at terminal means 104 by a time interval equal to the interval over which it is desired to integrate the output signal of the operational circuit 103.

A mechanical commutating system 111 is provided for the purpose of selectively gating the signals appearing at terminal means 104 and 119 to the integrating circuits 146, 150, and 154, and also for the purpose of selectively gating the output signals of the integrating circuits cyclically and sequentially to an output terminal means 189 and 192. The commutating system comprises a motor 105 and eight commutating members designated 111A through 111H, all connected to a common drive shaft. Alternatively, the commutating members 111A through 111H may be mounted on the same wheel or disc, with the conductive segments 123, 125, 127, 129, 131, 133, 175, and 185 concentrically positioned thereon at various radii from the center of the disc in a construction similar to that of the commutating member shown in Patent No. 2,790,137, Mayes.

The various commutating members are driven in a clockwise direction as indicated by arrow 121. Electrical connection is made between the conductive ring of the commutator members and terminals 104 and 119 through an electrical lead and a slip ring associated with each of the conductive members, as shown. Brushes 124, 126, 128, 130, 132, and 134 connect the conductive members to the appropriate integrating means associated therewith during the portions of each cycle of rotation of the commutator members during which the conductive segments thereof are in contact with the brush members.

The conductive segments of the various commutator members are pictured in their instantaneous relative positions. As shown with respect to commutator member 111A, the commutator members may be divided into three sectors, each comprising 120° of arc. The sectors are arbitrarily designated A, B, and C and are identified with respect to commutator member 111A. The cyclically repeated periods during which the sectors B and A rotate past brushes 124, 126, 128, 130, 132, and 134, will be designated $t_1$, $t_2$, and $t_3$, respectively. As shown, the conductive segment of commutator member 111A extends over sectors B and C thereof so that terminal means 104 is connected to the adding circuit resistor 135 for two-thirds of each revolution of the commutator member 111A. Likewise, the conductive segment of commutator member 111B extends over sector B of the commutator, that of commutator member 111C extends over sectors C and A, that of commutator member 111D extends over sector C, that of commutator member 111E extends over sectors A and B, and the conductive segment of commutator member 111F extends over sector A. Therefore, terminal means 104 and 119 will be concomitantly coupled to integrator 146 during an interval B corresponding to the time that the conductive strips thereof are connected to brushes 124 and 126.

Before describing the operation of the entire apparatue of FIG. 1, an explanation will be given of the operation of the portion of the apparatus including summing integrator 146 and commutator members 111A and 111B. Let it be assumed first that the commutator members 111A and 111B are being driven by motor 105 and that brush 124 is just beginning to contact the conductive member 123 at the beginning of the sector C of the commutator member. Brush 126 will not be in contact with conductive segment 125 until the commutator member 111B has rotated through another 120°. During the interval $t_1$ that brush 124 is contacting conductive segment 123 (i.e., during the period that the sector C of the commutator member 111A is rotating past brush 124), the signals appearing at terminal 104 will be fed to the integrator 146. The output signal from integrator 146 will be as shown during the initial period $t_1$ (see FIG. 3A). At the end of the period $t_1$, brush 124 will continue in contact with the conductive element 123, and brush 126 will begin contacting conductive segment 125. The delayed signal appearing at terminal 119, which will be a reverse-amplitude replica of the signal appearing at terminal 104 during the interval $t_1$, will be coupled to the integrator 146. Inasmuch as the signals appearing at terminal 119 are of reverse amplitude to the signals coupled to the integrator 146 through commutating member 111A from terminal 104, the signals will subtract from the signals from terminal 104. Furthermore, the ultimate effect will be that the integral of the signals appearing at terminal 104 during the interval $t_1$ will be continuously subtracted from the integral of the signals appearing at terminal 104 over the interval $t_2$. Therefore, the output signal of integrator 146 will be as shown in FIG. 3A over the interval $t_2$.

During the interval $t_2$ brush 173 is in contact with conductive segment 185 so that the output signal of integrator 146 is gated to output terminal 189. At the end of interval $t_2$, brushes 124 and 126 will be disconnected from terminals 104 and 119, respectively, inasmuch as conductive segments 123 and 125 have moved out of engagement with brushes 124 and 126, respectively. Furthermore, during the interval $t_3$ brush 177 is in contact with conductive segment 175 so that the output of operational amplifier 147 is grounded. The result is that the output of integrator 146 is reduced to zero as is shown over the interval $t_3$ in FIG. 3A. The cycle of operations described above will be cyclically repeated so that the waveform of the output voltage from integrator 146 will be as shown.

The operations of the portions of the circuit including integrators 150 and 154 are similar to that described above, with the exception that the time intervals are shifted. It can be readily appreciated from an inspection of FIG. 1 that brushes 130 and 134, respectively, are in contact with the conductive segments of their respective commutator members during intervals $t_1$ and $t_3$, respectively. Furthermore, brush 128 is in contact with conductive member 127 over intervals $t_3$ and $t_1$, and brush 132 is in contact with conductive segment 131 during intervals $t_2$ and $t_3$. In effect, therefore, the delayed signals appearing at terminal 119 are cyclically gated to integrating circuits 146, 150, and 154 in succession over contiguous time intervals. Furthermore, the signals appearing at terminal means 104 are gated to integrating means 146, 150, and 154 concomitantly with the gating thereto of the delayed signals appearing at terminal 119 and for a preceding period equal to the delay interval of delay means 107. Additionally, the output signals of the respective integrating means 147, 151, and 155 are gated to output means 189 concomitantly with the application thereto of the delayed signals appearing at terminal means 119 to the respective integrating circuits. At the end of each period during which the output signals of a particular amplifier are gated to terminal means 119, the output of the operational amplifier associated therewith is grounded so that the output signals of the particular integrator are reduced to zero. The composite signal appearing at terminal means 189 will be as is shown in FIG. 3D.

Figure 5:
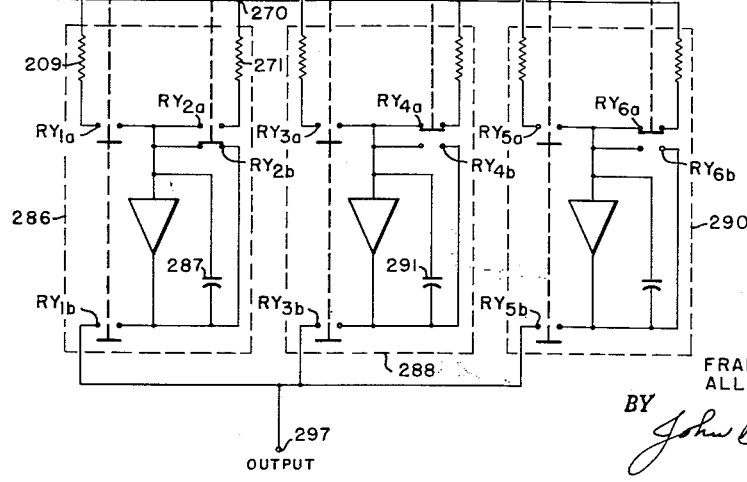
FIG. 5 is a schematic diagram of another embodiment of the invention.

FIG. 5 illustrates another embodiment of the invention wherein there is utilized a multiplicity of relay means and a relay control circuit rather than the mechanical commutating means shown in FIG. 1. The output of the operational circuit 103 of FIG. 1 may be considered to be applied to terminal 235 of frequency modulator 237. The purpose of the frequency modulator is fully described in the aforementioned patent application Serial No. 726,109. The output of the modulator is applied to a recording head 245 of a magnetic drum delay means having the same function as the delay member 107 of FIG. 1. The magnetic drum and its associated heads 251 and 257 provide a synchronized pulse source for purposes that will become apparent below. The traces recorded by recording head 245 are detected by pickup heads 247 and 249 and may be erased either by pickup head 249 or by a suitable erasing head (not shown). When the magnetic recording means 239 rotates in the direction designated by arrow 243, the signal produced by pickup head 249 will be delayed in time relative to the signal produced by pickup head 247.

The output signals of pickup heads 247 and 249 are applied to demodulators 265 and 267, respectively. Insofar as it is possible, the demodulators should be exact replicas of each other so that an output signal applied to both demodulators will result in identical output signals from the demodulators. The output signal of demodulator 267 is applied to an amplitude reversing circuit 269 similar to the circuit 109 of FIG. 1.

Summing integrators 286, 288, and 290, similar to integrators 146, 150, and 154, are interconnected with the contacts of relays $RY_1$, $RY_2$, $RY_3$, $RY_4$, $RY_5$, and $RY_6$ in a manner that will become apparent from the following description of the circuit.

Associated with each of the relays is a relay amplifier; these amplifiers are identified in the drawing by reference numerals 211A, 213A, 215A, 217A, 219A, and 221A. The relay amplifiers are cyclically energized according to a predetermined program by a ring relay control circuit 208. A schematic representation of control circuit 208 is shown in FIG. 4 and will be described in more detail below. The ring relay control has a pulse control terminal 207 and a plurality of output terminals 211, 213, 215, 217, 219, and 221 respectively connected to similarly numbered relay amplifiers.

For the purpose of providing synchronized pulses at terminal 207 spaced apart in time by the delay interval of signals detected by pickup heads 247 and 249, there is provided a circuit including recording head 251 and pickup head 257. Heads 251 and 257 are respectively positioned adjacent pickup heads 247 and 249 so that the delay interval between the recording of a signal by head 251 and reproduction thereof by head 257 will be the same as the delay interval of the signals detected by pickup heads 247 and 249. The output of pickup head 257 is fed on lead 263 to a pulse amplifier 261. One output signal from the pulse amplifier is fed to recording head 251, and the other output circuit is connected to terminal 207. An auxiliary terminal 259 is connected to recording head 251; an externally initiated start pulse may be coupled to terminal 259 for the purpose of recording an initial pulse trace on the magnetic recorder 239.

A preferred embodiment for relay control circuit 208 is shown in FIG. 4. The circuit comprises three bistable multivibrators 223, 225, and 227 interconnected so that only one of the vacuum tubes 201A, 202A, and 203A is conducting at any time, and so that two of vacuum tubes 201B, 202B, and 203B are always conducting. The plate of vacuum tube 201A is coupled to the grid of vacuum tube 202A by a capacitor 229, the plate of vacuum tube 202A is connected to the grid of vacuum tube 203A by capacitor 231, and the plate of vacuum tube 203A is connected to the grid of vacuum tube 201A by capacitor 233. This manner of connection insures that the conduction state of vacuum tubes 201A, 202A, and 203A is sequentially and cyclically transferred from one tube to the other.

The conduction state is transferred between vacuum tubes 201A, 202A, and 203A by application of a negative polarity trigger pulse between input terminals 207 and 205. Terminal 207 is connected to the grids of each of the vacuum tubes through the usual resistance elements. Terminal 205 is connected to the cathodes of each of the vacuum tubes. Output terminals for the circuit are numbered 211, 213, 215, 217, 219, and 221 and are respectively connected to the plates of vacuum tubes 201B, 201A, 202B, 202A, 203B, and 203A. The input terminals and output terminals designated immediately above are identified by corresponding reference numerals in FIG. 5. The circuitry is connected so that the vacuum tubes in FIG. 4 that are conducting energize the relays to which they are connected through amplifiers 211A, 213A, 215A, 217A, 219A and 221A. Thus, it can be seen that at any given time only one of relays $RY_1$, $RY_3$ and $RY_5$ will be actuated and that two of relays $RY_2$, $RY_4$, and $RY_6$ will be actuated. Furthermore, relays $RY_1$, $RY_3$, and $RY_5$ will be cyclically actuated sequentially in the named order.

The operation of the embodiment of FIG. 5 is as follows: Let it be assumed that motor 241 has been energized so as to drive magnetic drum 239 at a constant speed in the direction of arrow 243. Let it further be assumed that a start pulse has been applied to terminal 259 to record an initial pulse trace on the magnetic drum and that pulses are being applied to terminal 207 as a result of the repetitive pulses produced by the circuit including head 257, pulse amplifier 261, and recording head 251. Assuming also that an electrical signal is being applied to terminal 235, the modulated signal is recorded by head 245 and is detected by heads 247 and 249, and demodulated by demodulators 267 and 265. The output signal of demodulator 267 is inverted in amplitude by amplifier 269 and applied to terminal 268. The output of demodulator 265 appears at terminal 270.

The operation of the circuit will be best understood by referring to FIG. 6 which shows the actuation sequence of each of the relays $RY_1$ through $RY_6$. For example, relay $RY_1$ is actuated over each time interval $t_2$ of cyclically repeated, equal duration contiguous time intervals $t_1$, $t_2$, and $t_3$. Likewise, relay $RY_3$ is actuated over each time interval $t_3$, and relay $RY_5$ is actuated over each time interval $t_1$. Furthermore, relay $RY_2$ is actuated over each time interval $t_1$ and $t_2$, relay $RY_4$ is actuated over each time interval $t_2$ and $t_3$, and relay $RY_6$ is actuated over each time interval $t_3$ and $t_1$.

Consider now the operation of the integrating and summing circuit 286. Over the interval $t_1$, relay $RY_2$ will pick up to close contact $RY_{2a}$ and to open contact $RY_{2b}$. The output signal of demodulator 265 appearing at terminal 270 will be applied to the integrating amplifier through resistor 271 and will be summed over the interval $t_1$. During each time interval $t_2$ the relay $RY_1$ will pick up to close contact $RY_{1a}$ so that the delayed output signal appearing at terminal 268 will be applied to the amplifier through resistor 209. At the end of time interval $t_2$ and all during time interval $t_3$, relays $RY_1$ and $RY_2$ will drop out opening contacts $RY_{1a}$ and $RY_{2a}$ and closing contact $RY_{2b}$. In effect, this will short circuit capacitor 287 so that the output of the integrating amplifier will be brought to zero. At the beginning of the next time interval $t_1$, contact $RY_{2a}$ will again be closed and the cycle of operations will repeat.

Likewise, during time interval $t_2$, relay $RY_4$ will pick up to close contact $RY_{4a}$ so that the output signal of demodulator 265 will be integrated by integrator 288. During time interval $t_3$, relays $RY_3$, $RY_4$, and $RY_6$ will be picked up. This will close contacts $RY_{3a}$ and $RY_{3b}$ so that the delayed signal from amplifier 269 will be applied to integrator 288, and the output signal of integrator 288 will be coupled to output terminal 297. Furthermore, contact $RY_{6a}$ will be closed so that the signal appearing at terminal 270 will be applied to integrator 290. During time interval $t_1$, relay $RY_2$ will be picked up as described above, and additionally, relays $RY_5$ and $RY_6$ will be picked up to close contacts $RY_{5a}$, $RY_{5b}$, and $RY_{6a}$. Furthermore, relay $RY_4$ will drop out to close contact $RY_{4b}$ for the purpose of bringing the output signal of integrator 288 to zero by shorting capacitor 291. Closure of contacts $RY_{5a}$ and $RY_{5b}$ will result in both of the signals appearing at terminals 268 and 270 being integrated by integrator 290, and the output signal of integrator 290 being coupled to output terminal 297.

It will be readily appreciated that the functions of the mechanical commutator system described with reference to FIG. 1 and the relay commutating system described with reference to FIG. 5 are the same. The direct and delayed signals are coupled to the integrating circuit in the same sequence, and the output signals of the integrators are coupled to an output terminal in the same sequence. Furthermore, the output signals of the integrators are brought to zero in the same sequence.

It should be noted that the interval over which the delayed signal is applied to each of the integrators is substantially equal to the delay interval of the delay means, and that the output signal of each integrating means is coupled to an output terminal over a time interval substantially equal to the delay interval of the delay means.

The invention is not necessarily to be restricted to the specific structural details, arrangement of parts, or circuit connections, herein set forth, as various modifications thereof may be effected without departing from the spirit and scope of the invention.

What is claimed is:

1. Apparatus for integrating an electrical signal over a time interval of fixed duration, comprising: input terminal means to which said electrical signal may be applied; a plurality of integrating means for integrating electrical signals coupled thereto, each of said integrating means having an input circuit and an output circuit; first and second coupling means each interconnecting said input terminal means and said integrating means input circuits, said first and second coupling means including means for differentially combining the signals coupled to each integrating means input circuit; said first coupling means being adapted to cyclically and sequentially couple the electrical signal appearing at said input terminal to said integrating means input circuits while delaying the electrical signal for a predetermined period; said second coupling means being adapted to cyclically couple the electrical signal appearing at said input terminal to each of said input circuits concomitantly with each coupling of the delayed signal to said each input circuit and for a period before said each coupling of the delayed signal equal to the period by which the electrical signal is delayed by said first coupling means; and means coupled to said integrating means for gating the output signal of each integrating means to an output circuit concomitantly with the gating of the delayed signal to said each integrating means by said first means.

2. Apparatus for integrating an electrical signal over a time interval of fixed duration, comprising: input terminal means to which said electrical signal may be applied; a plurality of integrating means for integrating electrical signals coupled thereto; each of said integrating means having an input circuit adapted to sum electrical signals coupled thereto, and an output circuit; first and second coupling means interconnecting said input terminal and said integrating means input circuits; said first coupling means being adapted to cyclically and sequentially couple the electrical signal appearing at said input terminal to said integrating means input circuits while delaying the electrical signal for a predetermined period; said second coupling means being adapted to cyclically couple the electrical signal appearing at said input terminal to each of said input circuits substantially without time delay, concomitantly with each coupling of the delayed signal to said each input circuit and for a period before each coupling of the delayed signal equal to the period by which the electrical signal is delayed by said first coupling means; means coupled to said integrating means for gating the output signal of said each integrating means to an output circuit concomitantly with the gating of the delayed signal to said each integrating means by said first means; and means for reversing the polarity of one of the signals coupled to said each input circuit by said first and second means.

3. Apparatus for integrating an electrical signal over a time interval of fixed duration, comprising: input terminal means to which said electrical signal may be applied; a time delay circuit connected to said input terminal means for deriving an output signal delayed by said given time interval and of reverse polarity relative to the signal appearing at said input terminal means; first, second, and third integrating means each having an input circuit adapted to sum electrical signals coupled thereto, and an output circuit; means coupling said input terminal and said time delay circuit to said input circuits of said first, second, and third integrating means adapted, over first, second, and third consecutive, contiguous, repetitive time intervals, to gate the output signal of said time delay circuit to said input circuit of said first integrating means of each first time interval, to gate said time delay circuit output signal to said input circuit of said second integrating means over each second time interval, to gate said time delay output signal to said third integrating means input circuit over each third time interval, to gate said electrical signal to said first integrating means input circuit over each third and first time interval, to gate said electrical signal to said second integrating means input circuit over each first and second time interval, and to gate said electrical signal to said third integrating means input circuit over each second and third time interval; and means coupled to said first, second, and third integrating means for connecting the output signals of each integrating means to an output circuit during the intervals that said each integrating means is receiving signals from said time delay circuit.

4. Apparatus for integrating an electrical signal, comprising: input terminal means to which said electrical signal may be applied; first, second, and third integrating circuits for integrating electrical signals coupled thereto, each integrating circuit having an input circuit and an output circuit; first, second, and third adding circuits respectively connected to the input circuits of said first, second, and third integrating circuits, adapted to sum electrical signals coupled thereto; first, second, and third switch means respectively connected to said first, second, and third adding circuits, and each connected to said input terminal means, adapted when actuated to couple electrical signals from said input terminal means to said first, second, and third adding circuits respectively; circuit means connected to said input terminal means adapted to reproduce and reverse the phase of electrical signals appearing at said input terminal means and to delay the reproduced signals by a predetermined time interval; fourth, fifth, and sixth switch means each connected to said circuit means and respectively connected to said first, second, and third input circuit means, adapted when actuated to respectively couple the reproduced electrical signals from said circuit means to said first, second, and third input circuits; seventh, eighth, and ninth switch means respectively connected to the output circuits of said first, second, and third integrating circuits adapted when actuated to couple the integrating circuit output signals to an output circuit; and switch actuating means connected to all of said switch means adapted to cyclically and sequentially actuate said fourth, fifth, and sixth switch means over contiguous time intervals, to actuate said seventh, eighth, and ninth switch means, respectively, concomitantly with actuation of said fourth, fifth, and sixth switch means, respectively, to actuate said first, second, and third switch means, respectively, concomitantly with said fourth, fifth, and sixth switch means, respectively, and to further actuate said second, third, and fourth switch means, respectively, concomitantly with actuation of said fourth, fifth, and first switch means, respectively.

5. The combination of claim 4, wherein the switch actuating means comprises first, second, and third bistable trigger circuits, connected in a ring oscillator, each trigger circuit having a first section and a second section interconnected to shift conduction states responsive to a trigger pulse coupled thereto; means interconnecting said bistable trigger circuits so that only one first section is conducting at any time and so that shift in the conductive first section responsive to each trigger pulse progresses around the ring in a given direction; means connecting said first sections of said first, second, and third trigger circuits, respectively, to said first, second, and third switch means, respectively, for actuation thereof when said first sections are conducting; means connecting said second sections of said first, second, and third trigger circuits, respectively, to said fourth, fifth, and sixth switch means, respectively, for actuation thereof when said second sections are conducting; and means connecting the first section of said first, second, and third trigger circuits, respectively, to said seventh, eighth, and ninth switch means, respectively, for actuation thereof when the second section connected thereto is rendered conducting; and trigger pulse generating means coupled to said trigger circuits for coupling said trigger pulses thereto.

No references cited.